US012061353B2

(12) United States Patent
Ho et al.

(10) Patent No.: US 12,061,353 B2
(45) Date of Patent: Aug. 13, 2024

(54) BACKLIT MODULE AND KEY FOR BACKLIT KEYBOARD

(71) Applicant: Darfon Electronics Corp., Taoyuan (TW)

(72) Inventors: Hsin-Cheng Ho, Taoyuan (TW); Heng-Yi Huang, Taoyuan (TW)

(73) Assignee: DARFON ELECTRONICS CORP., Taoyuan (TW)

( * ) Notice: Subject to any disclaimer, the term of this patent is extended or adjusted under 35 U.S.C. 154(b) by 0 days.

(21) Appl. No.: 18/131,900

(22) Filed: Apr. 7, 2023

(65) Prior Publication Data

US 2023/0341606 A1    Oct. 26, 2023

Related U.S. Application Data

(60) Provisional application No. 63/477,871, filed on Dec. 30, 2022.

(30) Foreign Application Priority Data

Apr. 8, 2022   (TW) .................................. 111113486

(51) Int. Cl.
*F21V 8/00*     (2006.01)
*G06F 3/02*     (2006.01)

(52) U.S. Cl.
CPC ......... *G02B 6/0043* (2013.01); *G02B 6/0083* (2013.01); *G06F 3/0202* (2013.01)

(58) Field of Classification Search
CPC .... G02B 6/0043; G02B 6/0083; G06F 3/0202
See application file for complete search history.

(56) References Cited

U.S. PATENT DOCUMENTS

| 6,860,612 B2 | 3/2005 | Chiang et al. |
| 6,964,531 B2 | 11/2005 | Lin et al. |
| 8,383,971 B2 | 2/2013 | Liu |
| 8,742,432 B2 | 6/2014 | Sato et al. |

(Continued)

FOREIGN PATENT DOCUMENTS

| CN | 100482028 C | 4/2009 |
| CN | 101577260 A | 11/2009 |

(Continued)

OTHER PUBLICATIONS

Office action of counterpart application (112109776) by Taiwan IP Office on Oct. 20, 2023.

(Continued)

*Primary Examiner* — Mary Ellen Bowman

(57) ABSTRACT

A backlit module for a backlit keyboard is provided. The backlit module includes a lighting board. The lighting board includes a substrate and an electronic device layer. The electronic device layer is disposed on the substrate. The electronic device layer includes a plurality of key circuit groups. Each of the key circuit groups corresponds to a key group of the backlit keyboard, and includes one or more light sources and a resistor. When the key circuit group includes a plurality of light sources, the light sources are arranged in parallel. The one or more light sources correspond to one or more key of the key group. The resistor is arranged in series with the one or more light sources.

18 Claims, 6 Drawing Sheets

(56) References Cited

U.S. PATENT DOCUMENTS

| | | | |
|---|---|---|---|
| 9,214,301 B2 | 12/2015 | Chen | |
| 9,633,803 B2 | 4/2017 | Wang | |
| 11,443,907 B2* | 9/2022 | Ho | G02B 6/0068 |
| 2006/0011461 A1* | 1/2006 | Chan | G06F 3/0202 |
| | | | 200/344 |
| 2010/0038226 A1 | 2/2010 | Lin | |
| 2010/0182529 A1 | 7/2010 | Nakanishi | |
| 2011/0042124 A1 | 2/2011 | Matsui et al. | |
| 2011/0186340 A1 | 8/2011 | Kuramoto et al. | |
| 2011/0309379 A1 | 12/2011 | Shibusawa et al. | |
| 2012/0092260 A1 | 4/2012 | Liu | |
| 2012/0162085 A1* | 6/2012 | Mickelsen | G06F 3/0202 |
| | | | 345/170 |
| 2014/0138227 A1* | 5/2014 | Chen | H01H 13/83 |
| | | | 200/5 A |
| 2014/0168087 A1* | 6/2014 | Chen | H01H 13/83 |
| | | | 345/170 |
| 2014/0168935 A1 | 6/2014 | Chen | |
| 2016/0042891 A1 | 2/2016 | Ligtenberg et al. | |
| 2016/0284493 A1 | 9/2016 | Chen | |
| 2017/0328524 A1 | 11/2017 | Peterson et al. | |
| 2018/0106956 A1 | 4/2018 | Wang | |
| 2018/0321542 A1 | 11/2018 | Onishi | |
| 2019/0371537 A1 | 12/2019 | Huang et al. | |

FOREIGN PATENT DOCUMENTS

| | | |
|---|---|---|
| CN | 201440242 U | 4/2010 |
| CN | 201903837 U | 7/2011 |
| CN | 102625578 A | 8/2012 |
| CN | 105470378 A | 4/2016 |
| CN | 109114457 A | 1/2019 |
| CN | 109243896 A | 1/2019 |
| CN | 210129448 U | 3/2020 |
| CN | 212783186 U | 3/2021 |
| CN | 113972084 A | 1/2022 |
| CN | 1114068221 A | 2/2022 |
| TW | M478318 U | 5/2014 |
| TW | M546017 U | 7/2017 |
| TW | M547130 U | 8/2017 |
| TW | 202004809 A | 1/2020 |
| TW | 202004810 A | 1/2020 |
| TW | I685009 B | 2/2020 |
| TW | 202205328 A | 2/2022 |
| TW | 202206979 A | 2/2022 |

OTHER PUBLICATIONS

Office action of counterpart application (111143775) by Taiwan IP Office on Oct. 20, 2023.

* cited by examiner

BACKLIT MODULE AND KEY FOR BACKLIT KEYBOARD

This application claims the benefit of TW application Serial No. 111113486, filed on Apr. 8, 2022, and U.S. provisional application Ser. No. 63/477,871, filed on Dec. 30, 2022, and the subject matters of which are incorporated herein by references.

TECHNICAL FIELD

This disclosure relates to a backlit module and a key for a backlit keyboard.

BACKGROUND

In addition to perfection of basic functions, people often pursue added values in use of living tools, such as aesthetic feeling, comfort of use, or the like. Taking keyboards for example, in addition to a basic typing function, a luminous function may be desirable to facilitate use in low-light environments. Accordingly, backlit keyboards have been produced. Once keyboards are additionally provided with the luminous function, requirements for further improving illumination uniformity, increasing luminous modes, decreasing keyboard thickness, and the like.

SUMMARY

In this disclosure, a backlit module and a key for a backlit keyboard are provided. With concepts of the disclosure, the illumination uniformity of a backlit keyboard can be improved.

In a first embodiment of the disclosure, a backlit module for a backlit keyboard is provided. The backlit module comprises a lighting board. The lighting board comprises a substrate and an electronic device layer. The electronic device layer is disposed on the substrate. The electronic device layer comprises a plurality of key circuit groups. Each of the key circuit groups corresponds to a key group of the backlit keyboard, and comprises one or more light sources and a resistor. When the key circuit group comprises a plurality of light sources, the light sources are arranged in parallel. The one or more light sources correspond to one or more key of the key group. The resistor is arranged in series with the one or more light sources.

In a second embodiment of the disclosure, a backlit module for a backlit keyboard is provided. The backlit module comprises a lighting board. The lighting board comprises a polymer substrate and an electronic device layer. The electronic device layer is disposed on the substrate. The electronic device layer comprises a plurality of key circuit groups. Each of the key circuit groups corresponds to a key group of the backlit keyboard, and comprises one or more light sources and a resistor. When the key circuit group comprises a plurality of light sources, the light sources are arranged in parallel. The one or more light sources correspond to one or more key of the key group. The resistor is arranged in series with the one or more light sources. At least one of the key circuit groups further comprises an excess wiring having a S-shaped portion.

In a third embodiment of the disclosure, a key for a backlit keyboard is provided. The key has a key projection. The key comprises a backlit module and a cap. The backlit module comprises a lighting board. The lighting board comprises a substrate and an electronic device layer. The electronic device layer is disposed on the substrate. The electronic device layer comprises one or more light sources and a resistor located within the key projection. The cap is disposed on the backlit module.

Figure 1:
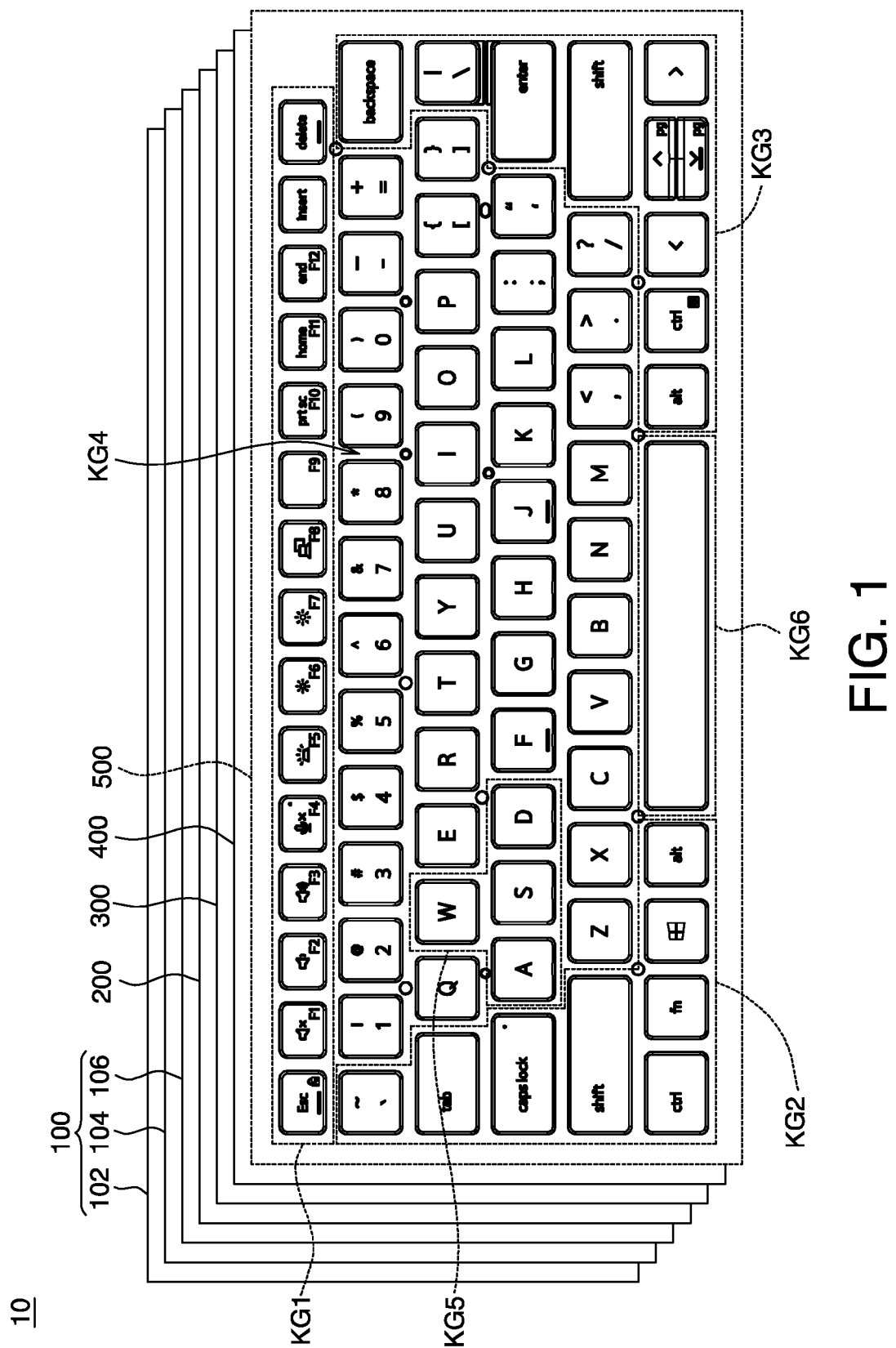
FIG. 1 shows a backlit keyboard to which the first embodiment to the third embodiment of the disclosure can be applied.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Various embodiments will be described more fully hereinafter with reference to accompanying drawings. The description and the drawings are provided for illustrative only, and not intended to result in a limitation. For clarity, the elements may not be drawn to scale. In addition, some elements and/or reference numerals may be omitted from some drawings. It is contemplated that the elements and features of one embodiment can be beneficially incorporated in another embodiment without further recitation.

The disclosure relates to a backlit module and a key for a backlit keyboard. Referring to FIG. 1, a backlit module 100 to which a backlit keyboard 10 according to the first or second embodiment of the disclosure and a key K according to the third embodiment of the disclosure can be applied is shown. In FIG. 1, except for a cap layer, other elements are shown as blank layers, so as to keep the drawing clean while still being able to understand the relative positions of the layers in the backlit keyboard 10. As shown in FIG. 1, the backlit keyboard 10 can comprise a backlit module 100, a bottom plate 200, a membrane switch layer 300, a supporting structure layer 400, and a cap layer 500. The bottom plate 200 is disposed on the backlit module 100. The membrane switch layer 300 is disposed on the bottom plate 200. The supporting structure layer 400 is disposed on the membrane switch layer 300. The cap layer 500 is disposed on the supporting structure layer 400. The backlit module 100 will be described more fully in following embodiments. As to other elements, details of which will not be provided herein to avoid obscuring the disclosure.

Figure 2A:
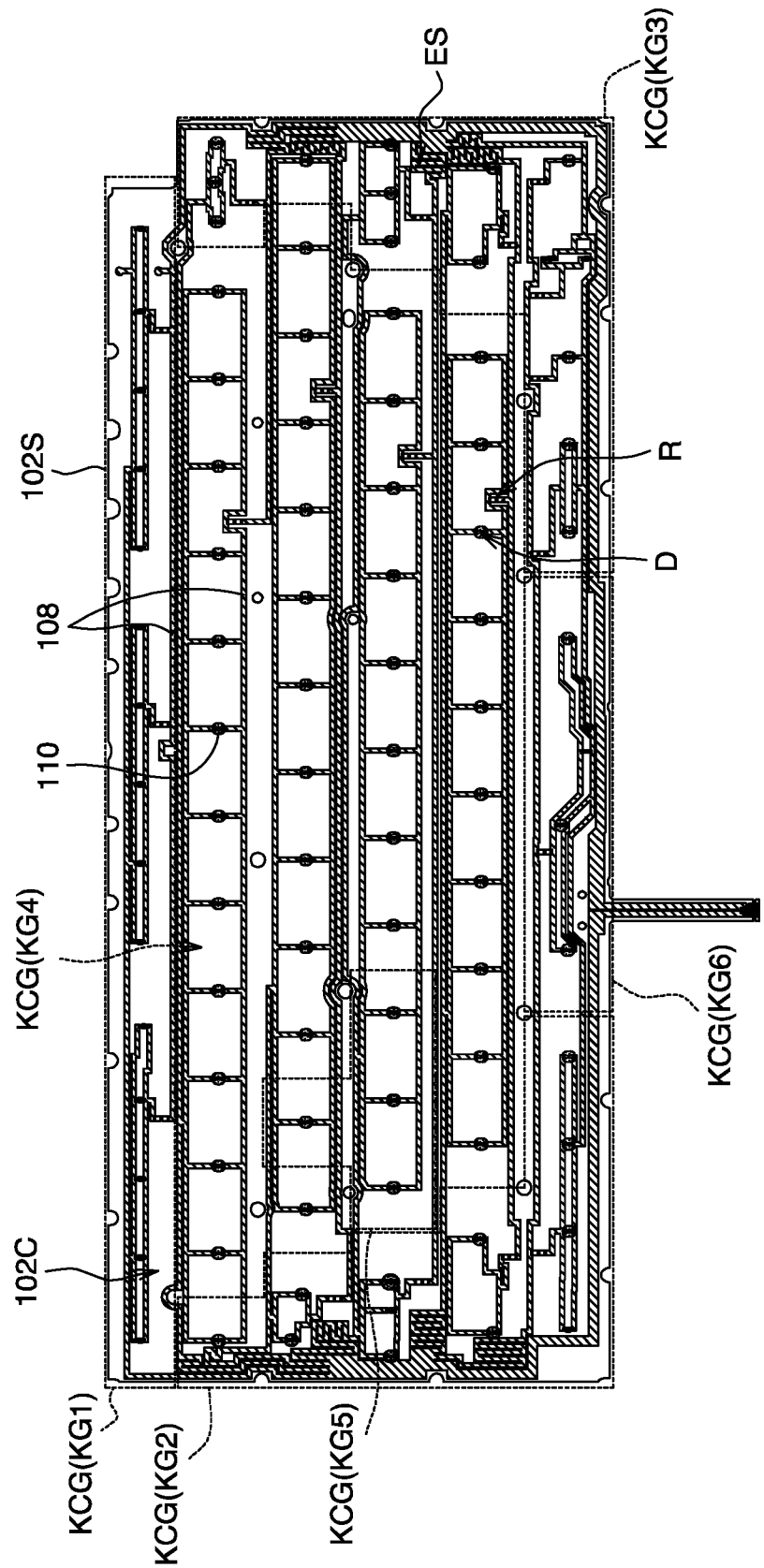
FIG. 2A shows a lighting board of a backlit module according to the first embodiment of the disclosure.
Figure 2B:
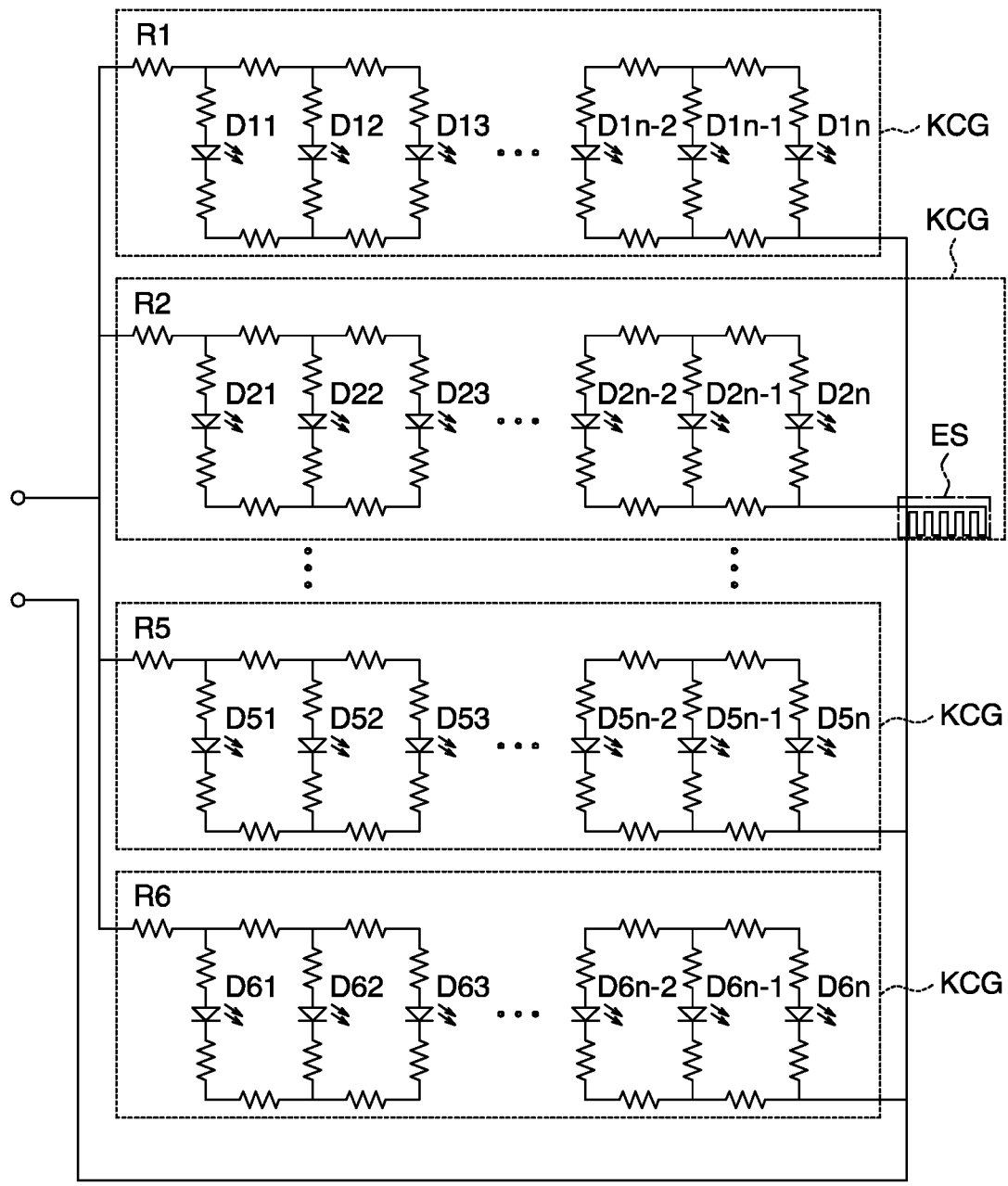
FIG. 2B shows a circuit diagram of the lighting board of the backlit module according to the first embodiment of the disclosure.

The first embodiment of the disclosure relates to a backlit module 100 for the backlit keyboard 10. Referring to FIGS. 2A-2B, the backlit module 100 comprises a lighting board 102, wherein FIG. 2A shows structural arrangements of some elements of the lighting board 102, and FIG. 2B shows a circuit diagram of the lighting board 102. The lighting board 102 comprises a substrate 102S and an electronic device layer 102C. The electronic device layer 102C is disposed on the substrate 102S. The electronic device layer 102C comprises a plurality of key circuit groups KCG. Each of the key circuit groups KCG corresponds to a key group KG1, KG2, KG3, KG4, KG5, or KG6 of the backlit keyboard 10, and comprises one or more light sources D and a resistor R. When the key circuit group KCG comprises a plurality of light sources D, the light sources D are arranged in parallel. The one or more light sources D corresponds to one or more keys K of the key group KG1, KG2, KG3, KG4, KG5, or KG6. The resistor R is arranged in series with the one or more light sources D. The light sources D can be, for example, light emitting diodes (LEDs). The resistors R can easily and accurately adjust line equivalent resistances of the key groups to ensure the illuminance uniformity of the whole backlit keyboard 10.

More specifically, referring to FIG. 2B, the key circuit groups KCG corresponding to the key groups KG1 to KG6 (shown in FIG. 1 and FIG. 2A) are shown in the drawing from top to bottom. The key circuit group KCG corresponding to the key group KG1 comprises light sources D11 to D1$n$ arranged in parallel and a resistor R1 arranged in series with the light sources D11 to D1$n$. The key circuit group KCG corresponding to the key group KG2 comprises light sources D21 to D2$n$ arranged in parallel and a resistor R2 arranged in series with the light sources D21 to D2$n$. The key circuit groups KCG corresponding to the key groups KG3 and KG4 are omitted in FIG. 2B. The key circuit group KCG corresponding to the key group KG5 comprises light sources D51 to D5$n$ arranged in parallel and a resistor R5 arranged in series with the light sources D51 to D5$n$. The key circuit group KCG corresponding to the key group KG6 comprises light sources D61 to D6$n$ arranged in parallel and a resistor R6 arranged in series with the light sources D61 to D6$n$.

The key circuit groups KCG are configured such that the corresponding key groups KG1, KG2, KG3, KG4, KG5, and KG6 emit light uniformly. To achieve this, the key circuit groups KCG have substantially same line equivalent resistances. Alternatively, the key circuit groups KCG can have line equivalent resistances within a relatively small range, so that variations of the emitted light of the key groups KG1, KG2, KG3, KG4, KG5, and KG6 under various light emitting requirements are still fall within tolerable variation ranges. The resistors R are used for adjusting the line equivalent resistances of the key circuit groups KCG, so that the line equivalent resistances of the key circuit groups KCG are substantially the same. In such conditions, the resistors R of at least two of the key circuit groups KCG can have different resistances.

The key groups KG1, KG2, KG3, KG4, KG5, and KG6 corresponding to the key circuit groups KCG can be different in at least one of shape, size, and number of corresponding keys. In other words, the shape, size, and number of corresponding keys can be different depending on requirements of the key groups. It can be understood that the key groups KG1, KG2, KG3, KG4, KG5, and KG6 illustrated in the drawings are provided for exemplary purposes only, and the backlit keyboard 10 can be grouped in other manner. For example, each row of keys of the backlit keyboard 10 can be designed as a key group, such that the backlit keyboard 10 is divided into six key groups in another way. The number of key groups is also changeable. For example, some backlit keyboards can have as many as 19 key groups.

At least one of the key circuit groups KCG can further comprise an excess wiring ES. The excess wiring ES can be arranged in parallel with the resistor R or in in series with the resistor R. The excess wiring ES has a S-shaped portion. As shown in FIGS. 2A-2B, the excess wiring ES can have parallel wiring portions in the S-shaped portion. In addition, the excess wiring ES can be continuous in the S-shaped portion. The excess wiring ES is formed of a conductive paste during forming circuit of the electronic device layer 102C. The conductive paste is a conductive liquid material containing metal, alloy, and/or conductor. Commonly used is silver paste/copper paste containing conductive metal and/or alloy particles of silver/copper and the like. In addition, the conductive paste can further comprise additives such as graphene to improve conductivity and reduce negative effect of rheology. The conductive paste can be coated onto the substrate 102 by a printing process or the like. The line equivalent resistance of a corresponding key circuit group KCG on the lighting board can be adjusted by changing a length of the excess wiring ES. Compared to the resistors R, the excess wiring ES is difficult to accurately control the line equivalent resistance of the key circuit group KCG to ensure the emission uniformity of the whole backlit keyboard 10 because it is limited by instabilities of the conductive paste and the printing process. However, cost of the excess wiring ES is lower. As such, the adjustment can be conducted roughly using the excess wiring ES, and then can be conducted accurately using the resistors R. For example, the excess wiring ES can be arranged in a key circuit group KCG only when the line equivalent resistance of the key circuit group KCG is lower.

The electronic device layer 102C can further comprise a plurality of main circuit pairs. Each of the main circuit pairs comprises two main circuits 108. Also, the electronic device layer 102C can further comprise a plurality of sub circuits 110 each arranged between two main circuits 108 of a corresponding one of the main circuit pairs. The main circuits 108 and the sub circuits 110 can be formed or at least partially formed by the conductive paste using the printing process as described above, but the disclosure is not limited thereto. Each of the main circuit pairs can extend under cap(s) of the key(s) K of corresponding one of the key group KG1, KG2, KG3, KG4, KG5, or KG6.

The one or more light sources D of each of the key circuit groups KCG are located between two main circuits 108 of corresponding one of the main circuit pairs. More specifically, the one or more light sources D of each of the key circuit groups KCG are corresponding one or more of the sub circuits 110, respectively. The resistor R of each of the key circuit groups KCG is disposed on one of two main circuits 108 of corresponding one of the main circuit pairs. The resistor(s) R can be located between two corresponding main circuits pairs, between two adjacent excess wirings ES, between two adjacent keys K, or all under the cap of one key K (such as the space key), according to actual design requirements. The excess wiring(s) ES can be located between two corresponding main circuits pairs, between two adjacent resistors R, adjacent to a light source D and/or a resistor R, or all under the cap of one multiple key (such as the space key), according to actual design requirements. Since the square keys have smaller areas, the excess wiring(s) ES may not be placed under the caps of the square keys to avoid affecting output of illumination light. In a single key group KG1, KG2, KG3, KG4, KG5, or KG6, the number of light source(s) D can be greater than, equivalent to, or less than the number of resistor(s) R. Under a single key K, the number of the light source(s) D can be greater than, equivalent to, or less than the number of resistor(s) R.

The backlit module 100 can further comprise a light guide plate 104 disposed on the lighting board 102. The light guide plate 104 is used to guide a path of illumination light. The backlit module 100 can further comprise a plurality of microstructures M (shown in FIGS. 3A-3C and FIG. 4) located between the light guide plate 104 and the lighting board 102 to guide a path of illumination light. The light source(s) D and the resistor(s) R can be disposed under the microstructures M. In addition, the lighting board 102 can further comprise a reflective layer 112 disposed on the substrate 102S to assist with guiding of a path of illumination light. The light guide plate 104 has a plurality of light guide plate holes for receiving the light source(s) D and the resistor(s) R.

The backlit module 100 can further comprise a light shielding plate 106 disposed, for example, on the light guide plate 104. The light shielding plate 106 comprises a transparent substrate 114, a transparent reflective layer 116, and an opaque layer 118. The transparent reflective layer 116 is disposed on the transparent substrate 114. The opaque layer 118 is disposed above the transparent reflective layer 116. Herein, when one element is described to be disposed "above" another element, it should be understood that the element can be disposed directly on the another element or the element can be disposed over the another element, and the rest can be obtained by the same analogy. The light source(s) D and the resistor(s) R can be located under the opaque layer 118.

The second embodiment of the disclosure relates to a backlit module for a backlit keyboard. The backlit module comprises a lighting board. The lighting board comprises a polymer substrate and an electronic device layer. The electronic device layer is disposed on the substrate. The electronic device layer comprises a plurality of key circuit groups. Each of the key circuit groups corresponds to a key group of the backlit keyboard, and comprises one or more light sources and a resistor. When the key circuit group comprises a plurality of light sources, the light sources are arranged in parallel. The one or more light sources correspond to one or more key of the key group. The resistor is arranged in series with the one or more light sources. At least one of the key circuit groups further comprises an excess wiring having a S-shaped portion.

The backlit module according to the second embodiment can be regarded as a special case of the backlit module 100 according to the first embodiment in which the material of the substrate 102S is polymer and at least one of the key circuit groups KCG further comprise the excess wiring ES. Other details of the backlit module according to the second embodiment are similar to the backlit module 100 according to the first embodiment, and will not be repeated again.

Figure 3A:
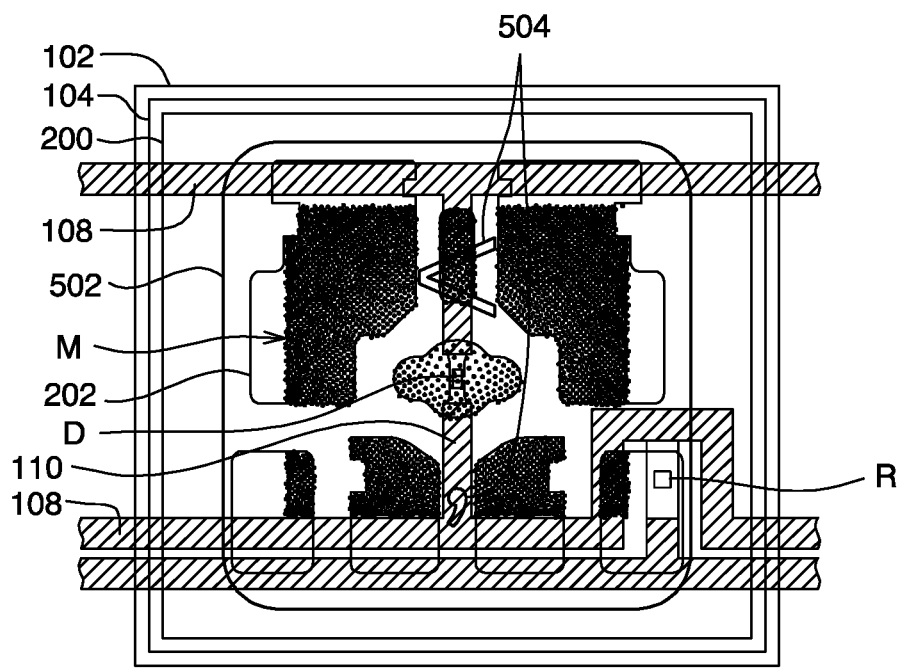
FIG. 3A shows a key projection of a key according to the third embodiment of the disclosure from which some elements are omitted.
Figure 3B:
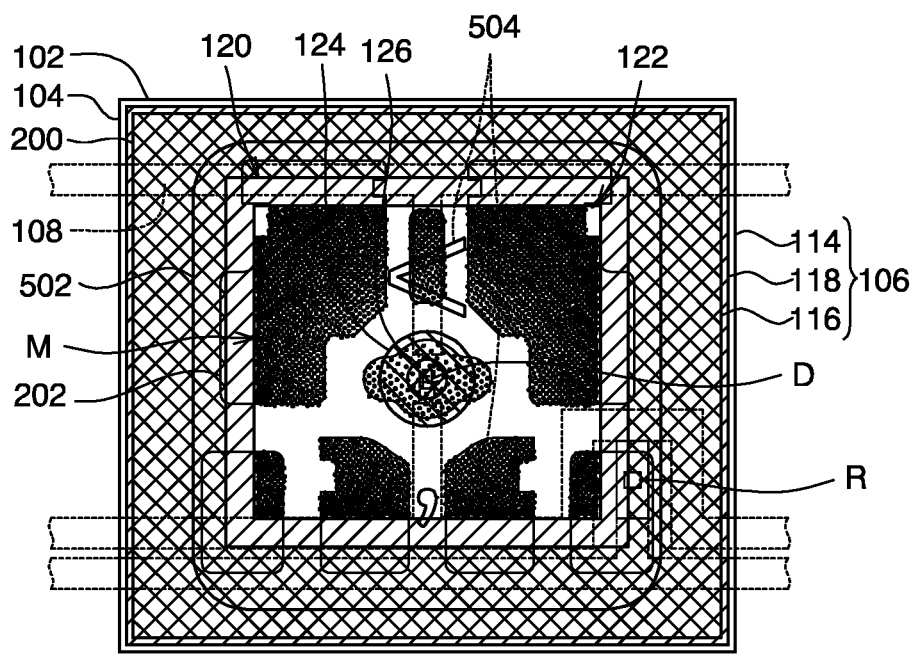
FIG. 3B shows the key projection of the key according to the third embodiment of the disclosure.

The third embodiment of the disclosure relates to a key K that can be used for the backlit keyboard 10. The key K has a key projection. Herein, the "key projection" should be understood as the projection of all elements of the key K (including the portion corresponding to the specific key K of an element common for all keys K) on a projection surface of the key K parallel to a main extension surface the backlit keyboard 10. In a general keyboard, the main extension surface and the projection surface are parallel to some large elements of the backlit keyboard 10 common for all keys K, such as the substrate 102S and the light guide plate 104 of the backlit module 100 as well as the bottom plate 200. In an ergonomic keyboard, the main extension surface may be a curved surface, but at the key K, the corresponding portion of the main extension surface can still be regarded as a plane for defining a projection surface. FIGS. 3A-3B show the key projection of the key K, wherein in FIG. 3A, the light shielding plate 106 is omitted such that other elements can be identified more clearly, and in FIG. 3B, the light shielding plate 106 is shown such that the relationship between the light shielding plate and other elements can be illustrated conveniently.

The key K comprises a backlit module 100 and a cap. The backlit module 100 comprises a lighting board 102. The lighting board 102 comprises a substrate 102S and an electronic device layer 102C (shown in FIGS. 2A-2B). The electronic device layer is disposed on the substrate 102S. The electronic device layer 102C comprises one or more light sources D and a resistor R. The light source(s) D and the resistor R are located within the key projection. The cap 502 is disposed on the backlit module 100.

The cap 502 can have one or more transparent characters. In other words, the key K can be a square key or a multiple key other than the space key. The cap 502 has a light output area 504 corresponding to the character(s).

Now the disclosure is back to the backlit module 100. The backlit module 100 can comprise, in addition to the lighting board 102, a light guide plate 104, a plurality of microstructures M, and a light shielding plate 106.

The substrate 102S of the lighting board 102 can be a flexible substrate, such as a polymer substrate. In the key K, the electronic device layer 102C can further comprise a main circuit pair, which comprises two main circuits 108, and one or more sub circuits 110 located between the two main circuits 108. The main circuits 108 and the sub circuit(s) 110 can be formed or at least partially formed by the conductive paste using the printing process as described above, but the disclosure is not limited thereto. The sub circuit(s) 110 can be determined according to the number of light source(s) D. For example, the light source(s) D can be disposed on the sub circuit(s) 110, respectively. In such conditions, the number of sub circuit(s) 110 can be identical to the number of light source(s) D. In the example of a square key, as shown in FIGS. 3A-3B, there can be only one light source D, and the number of sub circuit 110 is one. The resistor R is disposed on one of the main circuits 108. The lighting board 102 can further comprise a reflective layer 112. The reflective layer 112 is disposed on the substrate 102S to assist with guiding of a path of illumination light. The microstructures M can be located between two main circuits 108, and/or a plurality of microstructures M can be located at two sides of the sub circuit 110.

Figure 3C:
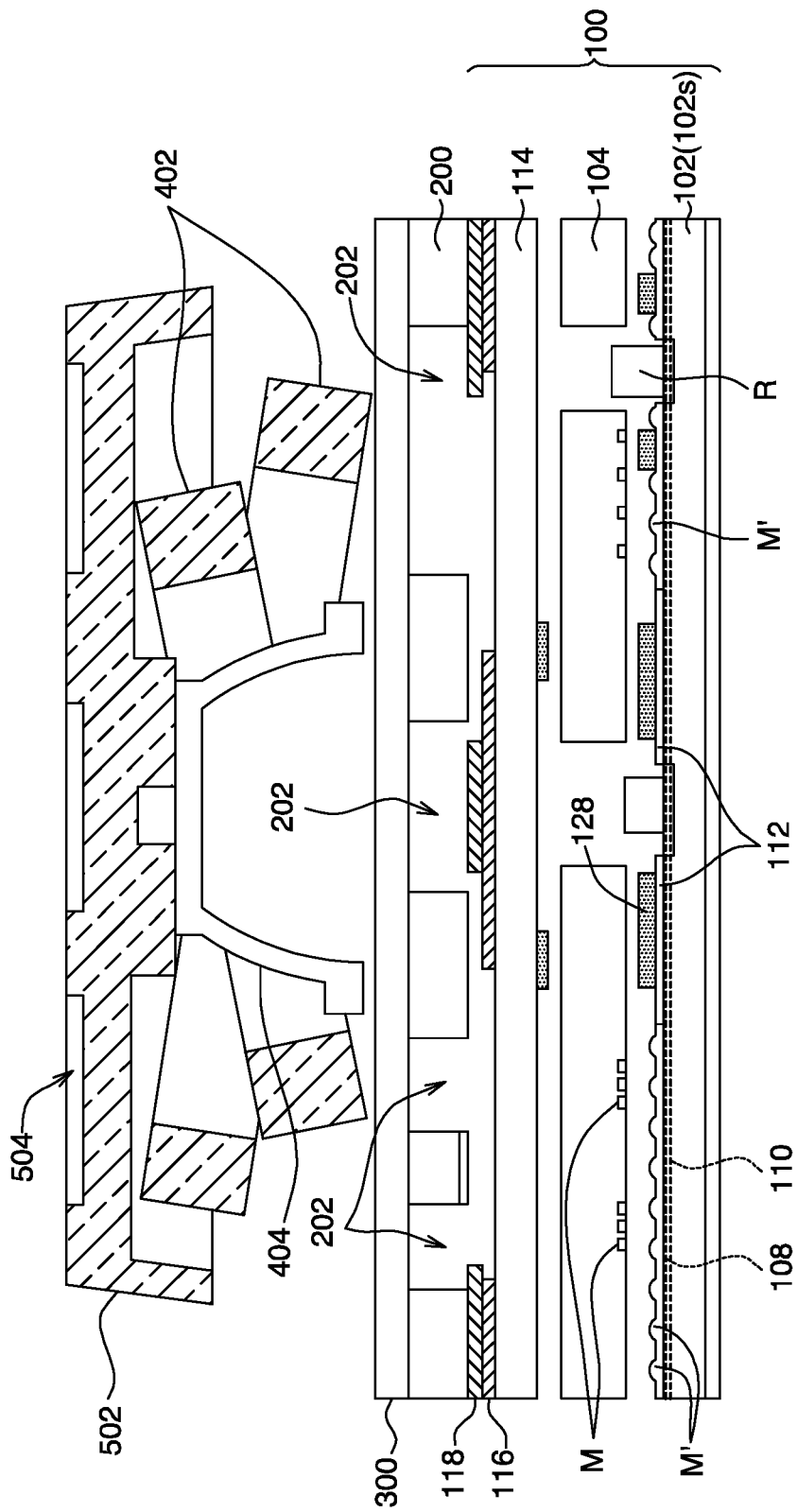
FIG. 3C shows a side view of the key according to the third embodiment of the disclosure.

The light guide plate 104 is disposed on the lighting board 102. The light guide plate 104 can be realized by, for example, a light guide plate. The microstructures M are located between the light guide plate 104 and the lighting board 102 to guide a path of illumination light. In FIG. 3C, the microstructures M is shown to be disposed on a bottom surface of the light guide plate 104. The backlit module 100 can further comprise a plurality of microstructures M' to assist with guiding of a path of illumination light. The microstructures M' can also be located between the light guide plate 104 and the lighting board 102, but are disposed above the substrate 102S, and particularly on a top surface of the reflective layer 112. As shown in FIGS. 3A-3B, within the key projection, the light source(s) D and the resistor R are at least partially surrounded by the microstructures M and/or M'. In other words, each of the one or more light sources D and the resistor R respectively overlaps a pattern formed by the microstructures M and/or M'.

The light shielding plate 106 is disposed on the light guide plate 104. The light shielding plate 106 comprises a transparent substrate 114, a transparent reflective layer 116, and an optional opaque layer 118. The transparent reflective layer 116 is disposed on the transparent substrate 114. The transparent reflective layer 116 can be formed by coating a white paint. The opaque layer 118 is disposed above the transparent reflective layer 116. The transparent reflective layer 116 can be formed by coating a black paint. As shown in FIGS. 3A-3B, within the key projection, the transparent reflective layer 116 has an opening 120, the opaque layer 118 has an opening 122, and an area of the opening 120 of the transparent reflective layer 116 can be greater than an area of the opening 122 of the opaque layer 118. The transparent reflective layer 116 further has a light source shielding portion 124 inside the opening 120. The opaque layer 118 further has a light source shielding portion 126. The one or more light sources D overlap the light source shielding portion 124 of the transparent reflective layer 116 and the light source shielding portion 126 of the opaque layer 118 inside the opening 120 of the transparent reflective layer 116 and the opening 122 of the opaque layer 118. An area of the light source shielding portion 124 of the transparent reflective layer 116 can be greater than an area of the light source shielding portion 126 of the opaque layer 118. The resistor R overlaps both the transparent reflective layer 116 and the opaque layer 118, for example, outside the opening 120 of the transparent reflective layer 116 and the opening 122 of the opaque layer 118. Within the key projection, the microstructures M can be located inside the openings 102 and 122 and overlap the light source shielding portions 124 and 126.

Figure 4:
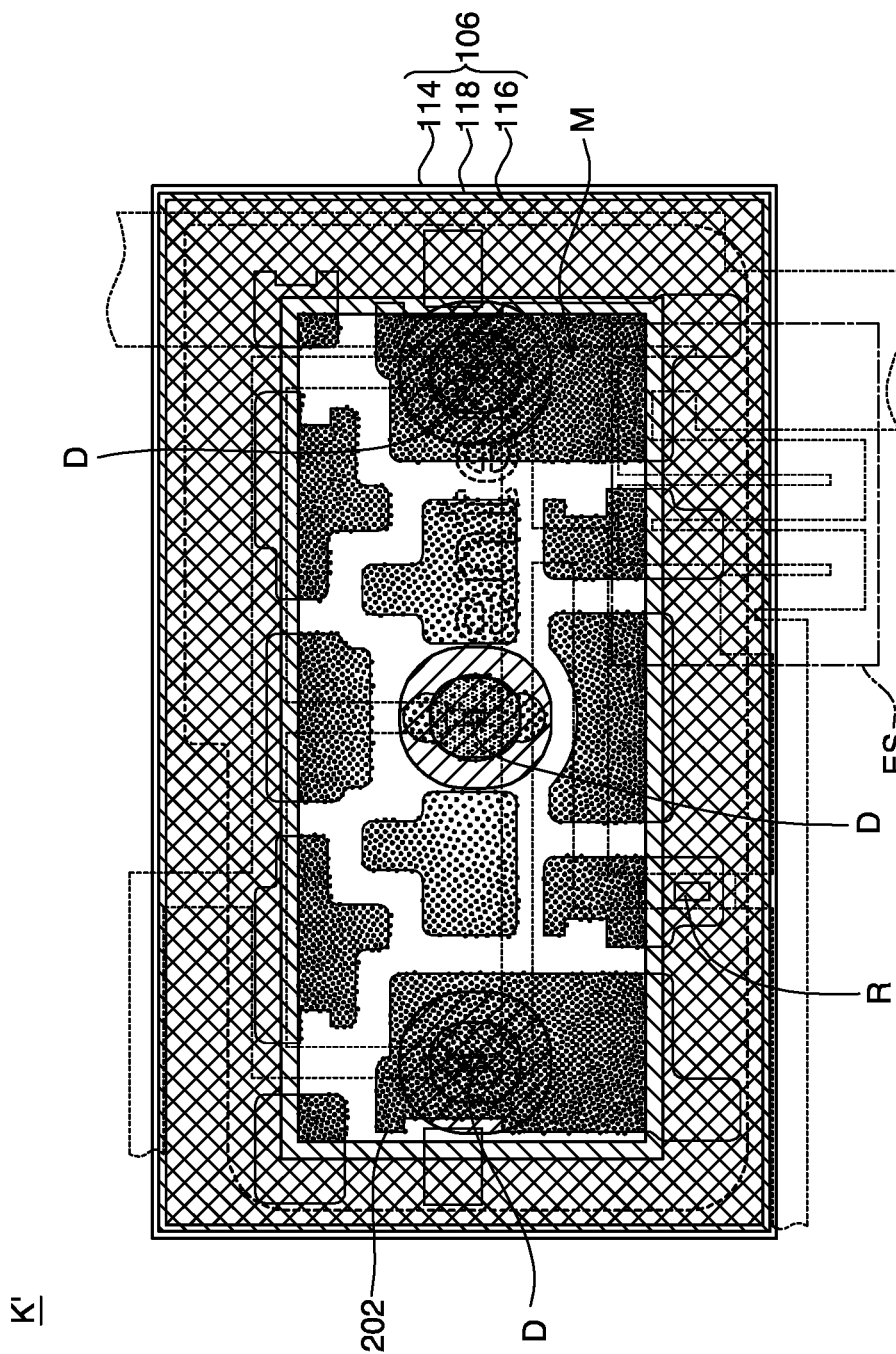
FIG. 4 shows a key projection of another key according to the third embodiment of the disclosure.

The backlit module 100 can further comprise an adhesive layer 128 used to, for example, bond the substrate 102 and the light guide plate 104 and bond the light guide plate 104 and the light shielding plate 106. At some positions of the key K, there is no adhesive layer 128 on the light guide plate 104 or under the light shielding plate 106, such that a clearance area is formed between the adhesive layer 128 and the light guide plate holes. The adhesive layer 128 and the microstructures M at least partially surround the resistor R. As shown in FIG. 4, the adhesive layer 128 that at least partially surrounds the resistor R can directly overlap the microstructures M, so as to diffuse and consume light in advance, and avoid a large amount of light leakage via the light guide plate hole accommodating the resistor R.

The key K can further comprise a bottom plate 200. The bottom plate 200 is disposed on the backlit module 100. The bottom plate 200 has a plurality of holes 202 within the key projection. In the example of a square key, as shown in FIGS. 3A-3B, within the key projection, a light source D overlaps corresponding one of the holes 202 of the bottom plate 200. The resistor R overlaps corresponding one of the holes 202 of the bottom plate 200. The microstructures M overlap the holes 202 of the bottom plate 200.

The key K can further comprise a membrane switch layer 300. The membrane switch layer 300 is disposed on the bottom plate 200. The key K can further comprise a supporting structure disposed on the membrane switch layer 300 and under the cap 502. The supporting structure comprises a lifting bracket 402 and a resetting member 404.

Referring to FIG. 4, a key projection of another key according to the third embodiment of the disclosure is shown. In the example of FIG. 4, the key K is a multiple key. In such conditions, the electronic device layer 102C can comprise a plurality of light sources D each overlapping corresponding one of the holes 202 of the bottom plate 200. The electronic device layer 102C can further comprise an excess wiring ES arranged in series with the resistor R and having a S-shaped portion. As shown in FIG. 4, within the key projection, the excess wiring ES overlaps a plurality of microstructures M for guiding a path of illumination light. The excess wiring ES can partially overlap the holes 202 of the lighting board 200.

In summary, the line equivalent resistances of the key groups are adjusted in the disclosure using the resistors and the optional excess wiring(s), and thus illumination uniformity of the backlit keyboard can be further improved.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A backlit module for a backlit keyboard, comprising:
   a lighting board, comprising:
      a substrate; and
      an electronic device layer disposed on the substrate, the electronic device layer comprising a plurality of key circuit groups, each of the key circuit groups corresponding to a key group of the backlit keyboard and comprising:
         one or more light sources, wherein when the key circuit group comprises a plurality of light sources, the light sources are arranged in parallel, and wherein the one or more light sources correspond to one or more keys of the key group; and
         a resistor arranged in series with the one or more light sources;
   an adhesive layer and a plurality of microstructures, wherein the adhesive layer and the microstructures at least partially surround the resistor, and the adhesive layer and the microstructures at least partially overlap.

2. The backlit module according to claim 1, wherein the key circuit groups have substantially same line equivalent resistances.

3. The backlit module according to claim 1, wherein the resistors of at least two of the key circuit groups have different resistances.

4. The backlit module according to claim 1, wherein the key groups corresponding to the key circuit groups are different in at least one of shape, size, and number of corresponding keys.

5. The backlit module according to claim 1, wherein at least one of the key circuit groups further comprises an excess wiring having a S-shaped portion.

6. The backlit module according to claim 5, wherein the excess wiring has parallel wiring portions in the S-shaped portion, and the excess wiring is continuous in the S-shaped portion.

7. The backlit module according to claim 1, wherein the electronic device layer further comprises:
   a plurality of main circuit pairs; and
   a plurality of sub circuits each arranged between two main circuits of corresponding one of the main circuit pairs;
   wherein the one or more light sources of each of the key circuit groups are disposed on corresponding one or more of the sub circuits, respectively, and the resistor of each of the key circuit groups is disposed on one of two main circuit of corresponding one of the main circuit pairs.

8. The backlit module according to claim 7, wherein an excess wiring is located between two corresponding two of the main circuit pairs.

9. The backlit module according to claim 1, comprising:
a light guide plate disposed on the lighting board; and
the microstructures located between the light guide plate and the lighting board to guide a path of illumination light, wherein the one or more light sources and the resistor of each of the key circuit groups are disposed under the microstructures.

10. The backlit module according to claim 1, further comprising:
a light shielding plate, comprising:
  a transparent substrate;
  a transparent reflective layer disposed on the transparent substrate; and
  an opaque layer disposed above the transparent reflective layer, wherein the one or more light sources and the resistor of each of the key circuit groups is located under the opaque layer.

11. A backlit module for a backlit keyboard, comprising:
a lighting board, comprising:
  a polymer substrate; and
  an electronic device layer disposed on the substrate, the electronic device layer comprising a plurality of key circuit groups, each of the key circuit groups corresponding to a key group of the backlit keyboard and comprising:
    one or more light sources, wherein when the key circuit group comprises a plurality of light sources, the light sources are arranged in parallel, and wherein the one or more light sources correspond to one or more keys of the key group; and
    a resistor arranged in series with the one or more light sources;
  wherein at least one of the key circuit groups further comprises an excess wiring having a S-shaped portion.

12. A key for a backlit keyboard, having a key projection and comprising:
a backlit module, comprising:
  a lighting board, comprising:
    a substrate; and
    an electronic device layer disposed on the substrate, the electronic device layer comprising one or more light sources and a resistor located within the key projection; and
  a plurality of microstructures located above the substrate of the lighting board to guide a path of illumination light;
  wherein within the key projection, each of the one or more light sources and the resistor overlaps a pattern formed by the microstructures; and
a cap disposed on the backlit module.

13. The key according to claim 12, wherein the cap has one or more transparent characters.

14. The key according to claim 12, further comprising:
a bottom plate disposed on the backlit module, the bottom plate having a plurality of holes within the key projection;
wherein within the key projection, the one or more light sources overlap corresponding one or more of the holes of the bottom plate, respectively, and the resistor overlaps corresponding one of the holes of the bottom plate.

15. The key according to claim 12, wherein the backlit module further comprises:
a light shielding plate located on a light guide plate, the light shielding plate comprising:
  a transparent substrate; and
  a transparent reflective layer disposed on the transparent substrate;
wherein within the key projection, the transparent reflective layer has an opening, the transparent reflective layer further has a light source shielding portion inside the opening, and the one or more light sources overlap the light source shielding portion of the transparent reflective layer.

16. The key according to claim 15, wherein the light shielding plate further comprises an opaque layer disposed above the transparent reflective layer, and the resistor overlaps both the transparent reflective layer and the opaque layer.

17. The key according to claim 12, wherein the electronic device layer further comprises an excess wiring arranged in series with the resistor, the excess wiring having a S-shaped portion.

18. The key according to claim 17, wherein within the key projection, the excess wiring overlaps the microstructures for guiding a path of illumination light.

* * * * *